(12) United States Patent
Mercer et al.

(10) Patent No.: US 6,225,782 B1
(45) Date of Patent: May 1, 2001

(54) METHOD AND APPARATUS FOR HI-Z MODE BATTERY CHARGING

(75) Inventors: Mark J. Mercer; Stuart B. Shacter, both of Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/186,790

(22) Filed: Nov. 4, 1998

(51) Int. Cl.$^7$ .................................................. H02J 7/00
(52) U.S. Cl. ........................................ 320/125; 323/280
(58) Field of Search .................................... 320/112, 125, 320/127, 128, 160, 162, 131; 323/275, 274, 280

(56) References Cited

U.S. PATENT DOCUMENTS

| 3,816,807 | 6/1974 | Taylor ................................. 320/139 |
| 5,369,364 | 11/1994 | Renirie et al. ...................... 324/430 |
| 5,548,205 | * 8/1996 | Monticelli ........................... 323/280 |
| 5,705,911 | * 1/1998 | Tamai ................................. 320/134 |

OTHER PUBLICATIONS

National Semiconductor LM3621 "Single Cell Lithium–Ion Battery Charger Controller" Data Sheet Jan. 1998.
Benchmarq bq2054 "Lithium Ion Fast–Charge IC" Data Sheet Oct. 1997.
Benchmarq bq2031 "Lead–Acid Fast–Charge IC" Data Sheet Apr. 1997.

* cited by examiner

*Primary Examiner*—Peter S. Wong
*Assistant Examiner*—Lawrence Luk
(74) *Attorney, Agent, or Firm*—Skjerven Morrill MacPherson LLP; Edward C. Kwok; Carmen C. Cook

(57) ABSTRACT

A circuit for providing hi-Z charging of a deeply discharged battery includes a load simulator circuit to provide a charging load resistance even when the battery has been discharged to 0V. The load simulator circuit includes a transistor connected in series with the battery. A logic circuit detects when the battery voltage is below a minimum threshold voltage and instructs a voltage control circuit to provide a constant voltage across the battery and the load simulator circuit. The logic circuit also applies the output of a current control circuit to the gate terminal of the transistor, enabling the current control circuit to regulate the total resistive load of the battery-transistor pair and thus maintain a constant hi-Z charge current across the battery. In addition, because the load simulator circuit allows the voltage applied to the battery to remain at a predetermined level above the battery voltage, that same voltage can also be used as the supply voltage for the related circuitry, eliminating the need for a separate fixed voltage supply.

16 Claims, 3 Drawing Sheets

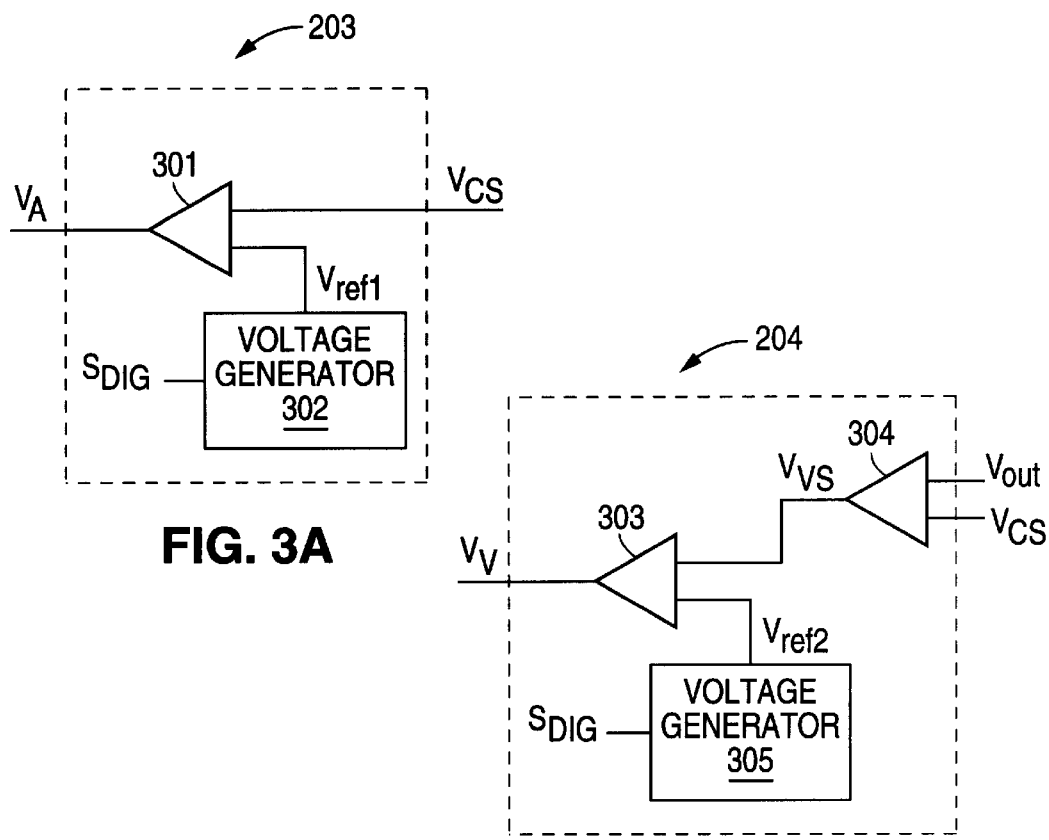
FIG. 3A
FIG. 3B
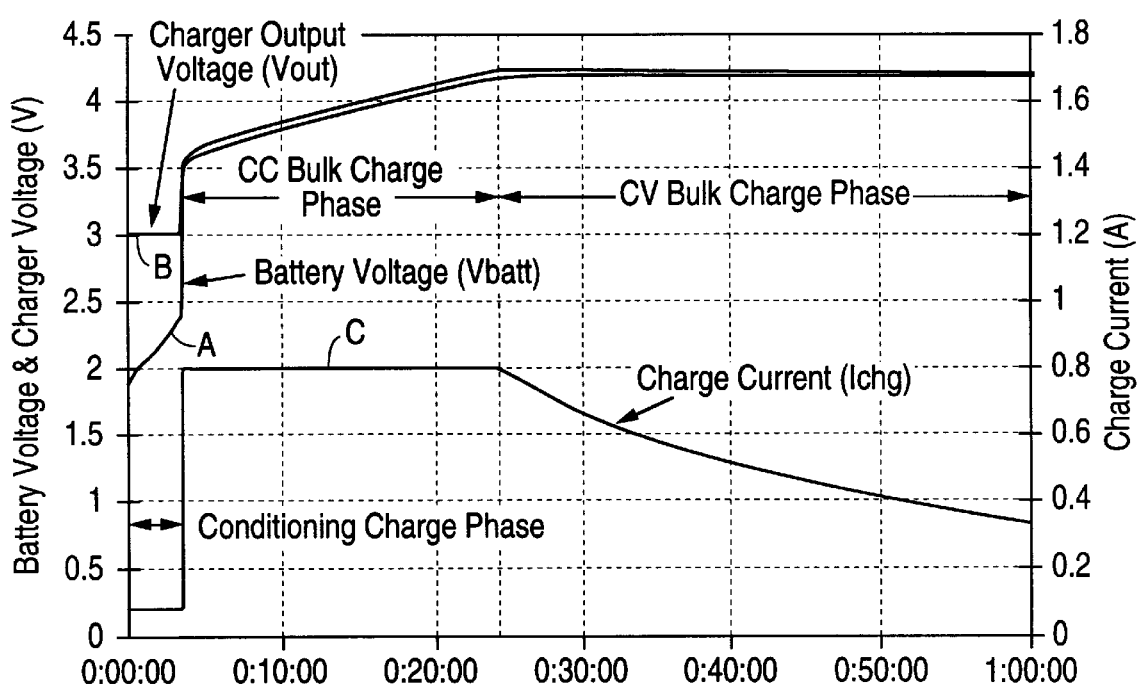
FIG. 4

METHOD AND APPARATUS FOR HI-Z MODE BATTERY CHARGING

BACKGROUND OF THE INVENTION

1. Field of the Invention

The present invention relates to battery chargers, and in particular, to a battery charger controller capable of charging secondary batteries that have been deeply discharged as low as 0V.

2. Discussion of the Related Art

In a battery charging system, a current control (CC) circuit and a voltage control (VC) circuit work in sequence to recharge a discharged battery. During bulk charging operation, the CC circuit provides a constant rapid-charge current to rapidly charge the battery until a final target voltage is reached. At that point, the charging system switches to maintenance operation as the VC circuit takes over to maintain the battery voltage at the final target voltage. The rapid-charge current applied by the CC circuit provides the maximum battery charging rate and reduces the overall recharging cycle time. However, a deeply discharged battery having a voltage below a minimum specified threshold voltage cannot accept the high rapid-charge current without risk of storage capacity degradation. The recommended method for charging a deeply discharged battery is to recharge at a reduced rate by providing a lower conditioning current until the battery voltage is above the minimum threshold voltage. This type of charging is referred to as hi-Z mode charging or battery conditioning charging.

In a conventional battery charging system with hi-Z charging capability, the conditioning current control is provided by a modified CC circuit. A conventional scheme for providing hi-Z charging is depicted in FIG. 1. A power source 101, controlled by a CC circuit 103 and a VC circuit 104, provides a charging voltage Vs to a battery 105. During bulk charging operation, CC circuit 103 monitors a charge current Ibatt flowing through battery 105 and maintains it at a rapid-charge current Imax. When a voltage Vbatt, measured across battery 105 by a differential amplifier 106, reaches a final target voltage Vfinal, VC circuit 104 maintains voltage Vbatt at voltage Vfinal. An output driver circuit 102 determines whether CC circuit 103 or VC circuit 104 has control of the battery charging system, and sends the appropriate control signal Vc to power source 101. CC circuit 103 includes a reference voltage generator 108 and an error amplifier 109. During bulk charging operation, reference voltage generator 108 produces a voltage Vref equal to a voltage Vrefa. Voltage Vrefa is defined by the formula:

$Vrefa = Imax * R114$ where R114 is the resistance of a monitoring resistor 114. Therefore, as it attempts to keep its inputs equal, error amplifier 109 maintains a constant current Imax flowing through battery 105. However, if voltage Vbatt is less than a minimum voltage Vmin, current Imax can permanently degrade the storage capacity of battery 105, so hi-Z mode charging must be performed. A hi-Z control circuit 107 detects when hi-Z charging is required and ensures that proper charging takes place. An embodiment of hi-Z control circuit 107 includes comparators 110 and 111, an AND gate 112, and a fault circuit 113. Comparator 110 compares voltage Vbatt to a reference voltage Vlco. Voltage Vlco is the minimum battery voltage at which the charging system can properly function. If voltage Vbatt is less than voltage Vlco, comparator 110 generates a logic LOW output signal, causing fault circuit 113 to assert a Vfault signal to prevent any charging operation. While voltage Vbatt is greater than voltage Vlco but less than voltage Vmin, comparator 110 outputs a logic HIGH signal while comparator 111 asserts a logic LOW signal. As a result, AND gate 112 sends a logic LOW signal to reference voltage generator 108, which generates a voltage Vrefb as its output voltage. Voltage Vrefb is defined by the formula:

$Vrefb = Icond * R114$ where Icond is a conditioning current required for proper hi-Z charging of battery 105. Thus, while Vbatt is less than Vmin, error amplifier 109 forces voltage Vs lower and lower until current Ibatt equals current Icond. When voltage Vbatt reaches voltage Vmin, the output of comparator 111 swings to a logic HIGH stage, bringing the output of AND gate 112 HIGH. This in turn switches the output of reference voltage generator 108 back to voltage Vrefa, which raises the charge current to Imax and begins bulk charging operation.

Due to the control system used in the aforementioned hi-Z charging circuit, a battery that has been discharged below voltage Vlco cannot be recharged. Such a deeply discharged battery begins to approximate a short circuit, and cannot be properly handled by conventional charging systems.

While some charging systems have overcome the limitation of recharging a deeply discharged battery, these charging systems have other shortcomings. An example of this type of charging system is battery charging IC's bq2031 and bq2054 from Benchmarq, which provide hi-Z charging for lead-acid and lithium-ion batteries, respectively. While these battery chargers allow charging of deeply discharged battery, these systems require a separate power supply to power the charger circuitry. The need for a separate power supply arises because hi-Z charging is provided by the reduction of source voltage Vs until current Ibatt drops to current Icond. During hi-Z charging operation, voltage Vs will fall below a rated operating supply voltage required by other charger circuits, such as circuits 102, 103, 104, 106, and 107 in FIG. 1. Therefore, an independent, fixed voltage source must be used to provide the rated operating supply voltage for these charger circuits.

Accordingly, it is desirable to provide a hi-Z charging control circuit that is capable of charging a battery having a voltage as low as 0 V and does not require a separate supply voltage for related circuitry.

SUMMARY OF THE INVENTION

The present invention provides, in a battery charging system including a current control (CC) circuit and a voltage control (VC) circuit, a load simulator circuit for charging a battery that has been discharged below a minimum voltage level, without requiring an additional supply voltage for the battery charging system. According to the present invention, the load simulator circuit provides a charging load resistance during hi-Z charging. In an embodiment of the present invention, the load simulator circuit includes a FET connected in series with the battery. By appropriately biasing the FET, a desired effective resistance is achieved so that the voltage across the battery and the FET is maintained at a constant level. The CC circuit maintains a constant conditional charge current by controlling the biasing of the FET. Meanwhile, the VC circuit maintains a constant charging voltage across the battery and the FET. The charging voltage is maintained at a voltage level greater than the battery voltage and therefore, the charging voltage can be used as supply voltage for other charger circuitry.

In another embodiment of the present invention, a high-Z control circuit is provided to control the CC and VC circuits in the high-Z charge mode. In one embodiment, the high-Z control circuit includes a voltage monitor to detect when the battery voltage is less than the minimum voltage level and a logic circuit to control the CC and VC circuits to provide proper hi-Z mode charging. Another embodiment of the present invention further includes a first reference voltage generator in the CC circuit and a second reference voltage generator in the VC circuit. The first and second reference voltage generators are controlled by the high-Z control circuit, and provide the predetermined reference voltages during hi-Z charging in order to make the CC and VC circuits provide a constant conditioning current.

The present invention will be better understood upon consideration of the accompanying drawings and the detailed description below.

BRIEF DESCRIPTION OF THE DRAWINGS

FIG. 3a shows an embodiment of a current control circuit of the present invention.

FIG. 3b shows an embodiment of a voltage control circuit of the present invention.

FIG. 4 is a plot of the battery voltage, charger output voltage and charge current versus time illustrating the operation of the charger control circuit in accordance with the present invention.

Use of the same reference numbers in different figures indicates similar or like elements.

DETAILED DESCRIPTION

Figure 1:
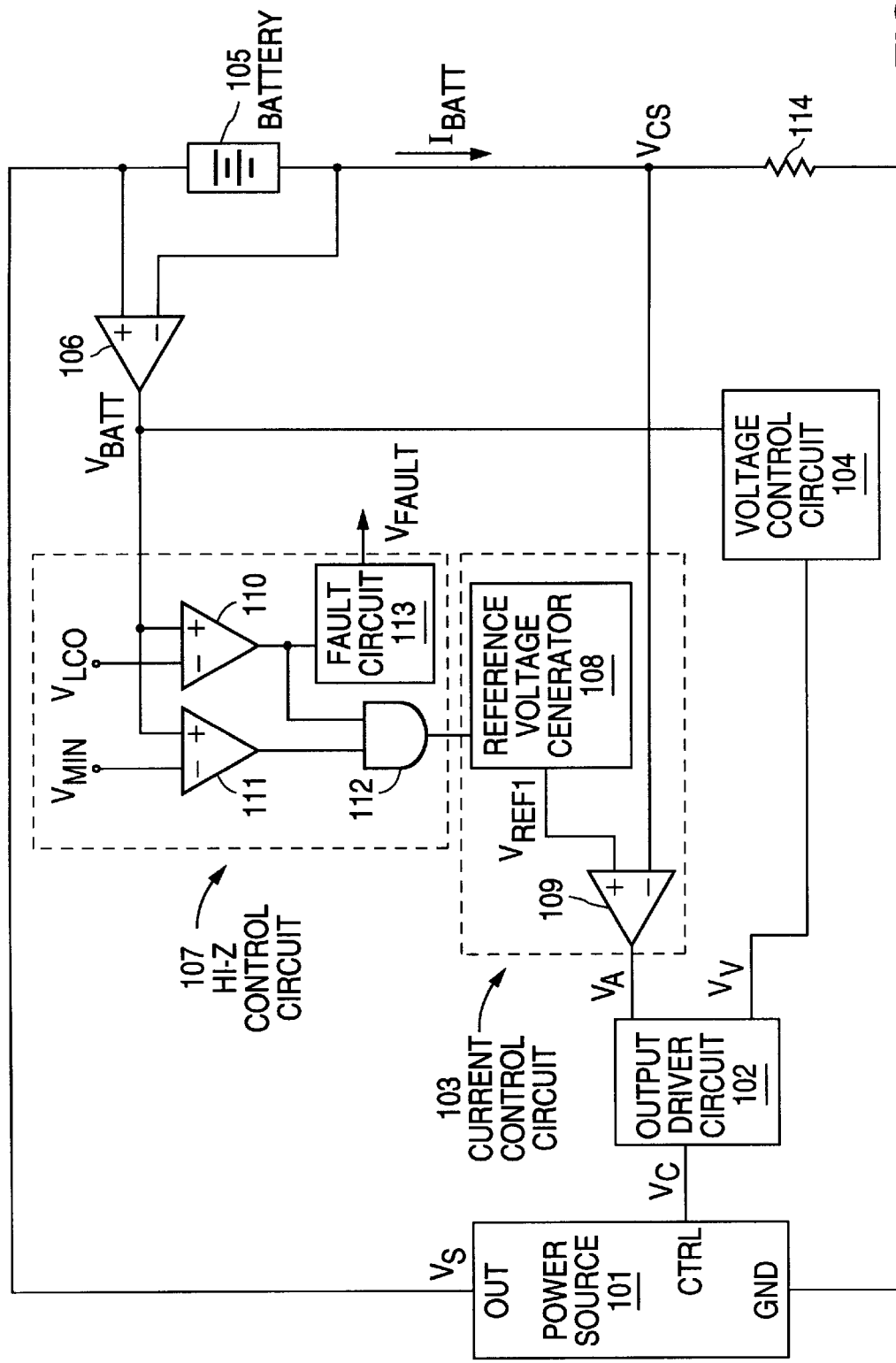
FIG. 1 shows, in the prior art, a conventional battery charging system including hi-Z charging.
Figure 2:
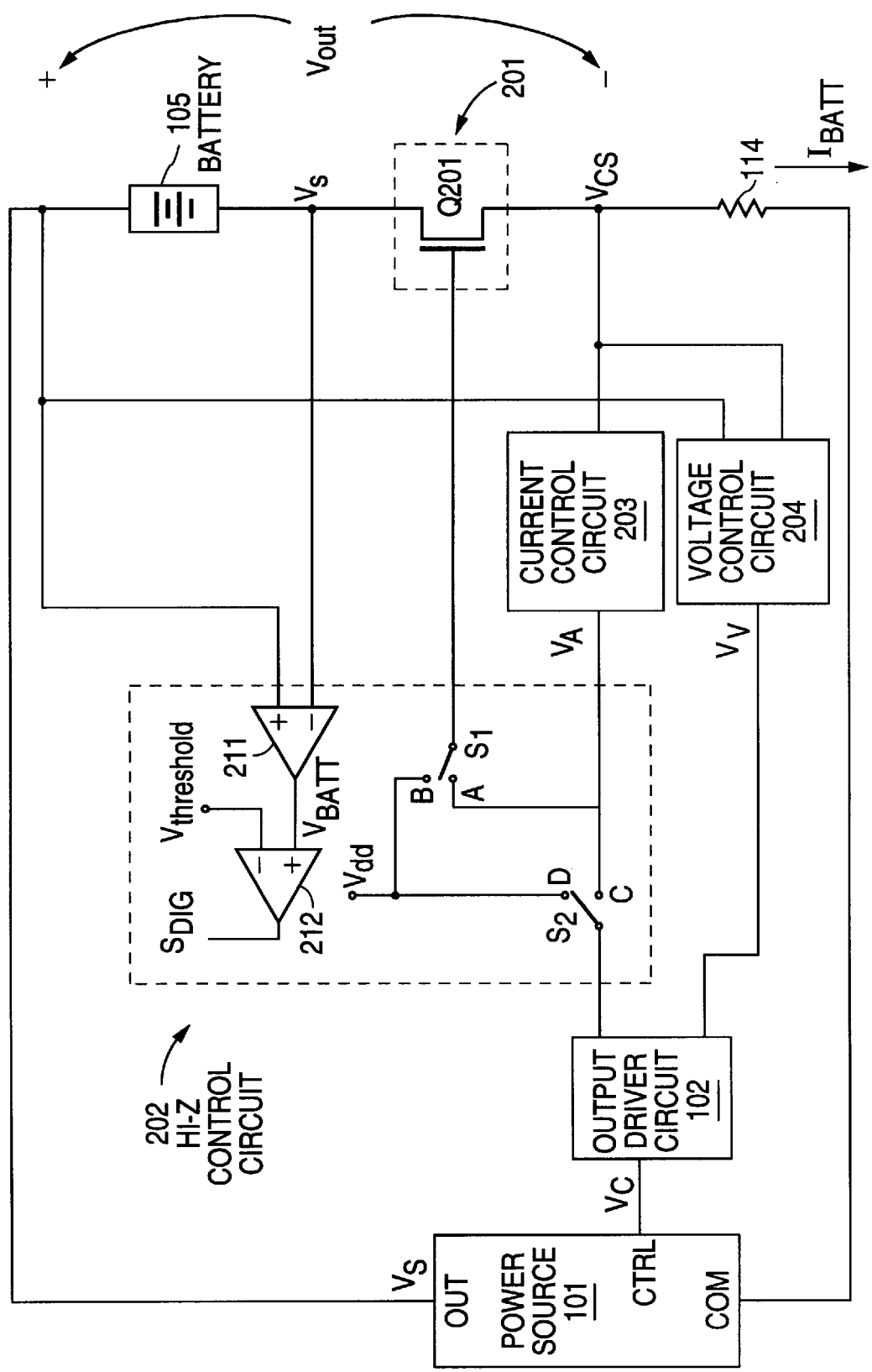
FIG. 2 shows a charging system incorporating a full-range hi-Z charging control.

The present invention provides a charging control circuit for a battery charging system that enables proper hi-Z charging of a battery that has been discharged as low as 0 V. The present invention also allows the battery charging voltage (Vs) to be used as the supply voltage for the charging system circuitry, obviating the need for a separate supply voltage in hi-Z charge mode. FIG. 2 shows a block diagram of an implementation of the present invention incorporated into a battery charging system. An output driver circuit 102 sends a control signal Vc to a power source 101, which provides a battery charging voltage Vs to a battery 105. A constant current or constant voltage is maintained across battery 105 by a current control (CC) circuit 203 or a voltage control (VC) circuit 204, respectively. CC circuit 203 monitors the voltage drop Vcs across a current sensing resistor 114 and generates a control signal Va to control a current Ibatt flowing through battery 105. Bulk charging of battery 105 is provided when current Ibatt is maintained at a high rapid-charge current Imax, while hi-Z charging is provided when current Ibatt is maintained at a much smaller conditioning-charge current Icond. An implementation of CC circuit 203 is shown in FIG. 3a. An error amplifier 301 compares voltage Vcs to a reference voltage Vref1 from a voltage generator 302. Voltage generator 302 provides either a rapid-charge reference voltage Vrapid or a conditioning-charge reference voltage Vcond, depending on the state of a control signal Sdig. Voltage Vrapid is defined by the equation:

$$Vrapid = Imax * R114$$

where R114 is the resistance of resistor 114. Voltage Vcond is defined by the equation:

$$Vcond = Icond * R114$$

Therefore, while voltage Vref1 equals voltage Vrapid, error amplifier 301 forces constant current Imax across battery 105 to provide rapid charging. However, when voltage Vref1 is at voltage Vcond, error amplifier 301 maintains current Ibatt at the lower conditioning current Icond to ensure proper hi-Z charging. CC circuit 203 regulates the hi-Z charge current Icond by adjusting the load resistance provided by a load simulator circuit 201 connected to battery 105. In one embodiment, circuit 201 includes an n-channel field effect transistor (FET) Q201 connected in series with battery 105.

Still referring to FIG. 2, VC circuit 204 monitors a voltage Vout across battery 105 and FET Q201 and generates a control signal Vv to control voltage Vout. An implementation of VC circuit 204 is shown in FIG. 3b. A unity-gain differential amplifier 304 measures the difference between voltages Vout and Vcs, producing a voltage Vvs. An error amplifier 303 compares voltage Vvs to a reference voltage Vref2 generated by a voltage generator 305. Voltage Vref2 is either equal to a maintenance reference voltage Vfinal or a conditioning reference voltage Vmin, depending on the state of control signal Sdig. Voltage Vfinal is equal to the fully charged voltage of battery 105, while voltage Vmin is the reduced voltage desired across battery 105 and circuit 201 during hi-Z charging. Thus error amplifier 303 holds the voltage across battery 105 and circuit 201 at voltage Vfinal when voltage Vref2 equals voltage Vfinal, and at voltage Vmin when voltage Vref2 equals voltage Vmin.

During non-hi-Z charging operation, only one out of CC circuit 203 and VC circuit 204 is in control of the charging process at any given time. The circuit having the lower output signal determines the manner of operation and prevents the output of the other circuit from having any effect. Error amplifiers 301 and 303 are biased such that output signal Va controls output driver circuit 102 during bulk charging mode, while output signal Vv assumes control after battery 105 reaches its fully charged voltage Vfinal.

However, during hi-Z charging operation, both CC circuit 203 and VC circuit 204 work concurrently. VC circuit 204 maintains a constant voltage Vmin across battery 105 and FET Q201. At the same time, CC circuit 203 adjusts the bias voltage at the gate terminal of FET Q201, varying the "on" resistance of FET Q201, in order to keep current Ibatt fixed at current Icond. Control over FET Q201 is provided to CC circuit 203 by a hi-Z control (ZC) circuit 202. An implementation of ZC circuit 202 includes a differential amplifier 211, a comparator 212, and switches S1 and S2. Unity gain differential amplifier 211 monitors the voltage across battery 105 and generates an output voltage Vbatt. Comparator 212 compares voltage Vbatt to a reference voltage Vthreshold. Voltage Vthreshold is the battery voltage below which hi-Z charging must be performed. When voltage Vbatt is less than voltage Vthreshold, comparator 212 generates control signal Sdig in a logic HIGH state to instruct voltage generators 302 and 305 to output voltages Vcond and Vmin, respectively, while also causing switch S1 to close on terminal A and switch S2 to close on terminal D. The configuration of switches S1 and S2 disconnects the output of CC circuit 203 from output driver circuit 102, applying it instead to the gate terminal of FET Q201. As a result, VC circuit 204 takes full control over the output of power source 101, maintaining voltage Vmin across battery 105 and FET Q201. CC circuit 203 keeps current Ibatt at current Icond by adjusting the bias voltage at the gate terminal of FET Q201, modulating the effective "on" resistance of FET Q201 as the voltage of battery 105 varies in order to provide a constant load resistance for voltage Vmin. In this manner, hi-Z charging is provided to battery 105.

When voltage Vbatt rises above voltage Vthreshold, control signal Sdig falls to a logic LOW state, switching the outputs of voltage generators 302 and 305 to voltages Vrapid and Vfinal, respectively, while also causing switch S1 to close on terminal B and switch S2 to close on terminal C. Switch S1 disconnects CC circuit 203 from FET Q201, connecting the gate terminal of FET Q201 to supply voltage Vdd. This gate bias pushes FET Q201 into its linear region, dropping its resistance down to a small "on" resistance. CC circuit 203 is reconnected to output driver 102 by switch S2, and takes control of the charging circuit, driving current Ibatt up to rapid-charge current Imax. Battery charging then proceeds in the same manner as in conventional battery charging systems.

FIG. 4 illustrates the operation of a battery charger incorporating the charging control circuit of the present invention in the high-Z charge mode and the bulk charge mode. In FIG. 4, curve A illustrates the battery voltage (Vbatt), curve B illustrates the charger output voltage (Vout), and curve C illustrates the charge current. At time 0, the battery voltage Vbatt of battery 105 is approximately 1.8 volts (curve A) which is below the reference voltage Vthreshold of 2.4 volts. Therefore, the battery charger activates the hi-Z charge mode which is depicted as the conditioning charge phase from time 0 to a time of about 4 minutes in FIG. 4. In the present example, Vthreshold is specified at 2.4 volts. This is for illustration only and is not intended to limit the present invention to a Vthreshold value of 2.4 volts only. Similarly, FIG. 4 is used to illustrate the operational characteristics of a battery charger in accordance with the present invention, and is not intended to limit the parameters of the charging control circuit to those specified in FIG. 4 only.

During the conditioning charge phase where battery 105 is charged in the high-Z charge mode, CC circuit 203 maintains a constant conditioning charge current Icond of approximately 80 mA (curve C) by adjusting the gate bias voltage applied to FET Q201. Meanwhile, VC circuit 204 regulates the charger output voltage Vout to a constant voltage value of 3 volts (curve B). Because FET Q201 provides a load resistance when battery 105 is very deeply discharged, voltage Vout can be kept at a high level (e.g. 3 volts) even while low current Icond is required for hi-Z charging. This provides the additional benefit of enabling voltage Vout to also be used as the power supply voltage for the associated charging circuitry, eliminating the need for a separate fixed voltage supply. As illustrated in FIG. 4, battery voltage Vbatt (curve A) continues to rise during the conditioning charge phase until it reaches Vthreshold of 2.4 volts. Thereafter, the battery charger activates the constant current bulk charge phase as illustrated in FIG. 4 between the time 4 minutes and the time 24 minutes. The battery charger charges battery 105 in a conventional manner. CC circuit 203 regulates the charge current to the rapid-charge current (Imax) value of 0.8 A (curve C). During the constant current bulk charge phase, the battery voltage Vbatt continues to rise until it reaches the final target voltage Vfinal of 4.2 volts at a time of about 24 minutes (curve A). Thereafter, the charger transitions into the constant voltage bulk charge phase where VC circuit 204 maintains Vbatt at the final voltage value of 4.2 volts by gradually decreasing the charge current.

The above detailed description is provided to illustrate the specific embodiments of the present invention, and is not intended to be limiting. Numerous variations and modifications within the present invention will be apparent to one skilled in the art. For example, in VC circuit 204, by adjusting the gain factor of differential amplifier 304 to an appropriate non-unity value, alternative reference values of voltage Vref2 from voltage generator 305 can be accommodated. Similarly, in hi-Z control circuit 202, the gain factor of differential amplifier 211 can be set to provide proper circuit performance for various values of voltage Vthreshold. Also, control of load simulator circuit 201 could be provided by a circuit separate from CC circuit 203. Likewise, voltage control over battery 105 and load simulator circuit 201 during hi-Z charging could be provided by a circuit separate from VC circuit 204. Finally, load simulator circuit could properly function with a bipolar junction transistor in place of FET Q201.

We claim:

1. A battery charger for charging a secondary battery connected thereto, comprising:

a load simulator circuit for providing a variable load resistance to said battery;

a current control circuit for regulating a charge current through said battery; and a voltage control circuit for regulating a charging voltage across said battery and said load simulator circuit;

wherein when a battery voltage of said battery is less than a predefined minimum voltage level and said charger activates a high-Z charge mode, said current control circuit regulates said charge current to a first current value by modulating the load resistance of said load simulator circuit, and said voltage control circuit regulates said charging voltage to a first voltage value greater than said battery voltage.

2. The battery charger of claim 1, wherein said current control circuit regulates said charging current in concurrent with said voltage control circuit regulating said charging voltage.

3. The battery charger of claim 1, wherein when said battery voltage is greater than said predefined minimum voltage and said charger activates a bulk charge mode, said charger sets the load resistance of said load simulator circuit to a minimum resistance value, said current control circuit regulates said charge current to a second current value for charging said battery until said battery voltage reaches a predefined final voltage level, and said voltage control circuit regulates said charge current to maintain said battery voltage at said predefined final voltage level.

4. The battery charger of claim 3, wherein said first current value is substantially less than said second current value.

5. The battery charger of claim 1, wherein said load simulator circuit comprises a transistor connected in series with said battery wherein said current control circuit modulates the load resistance of said load simulator circuit by adjusting a bias voltage applied to a controlling input terminal of said transistor.

6. The battery charger of claim 5, wherein said transistor is a field effect transistor and said controlling input terminal is a gate terminal of said field effect transistor.

7. The battery charger of claim 5, wherein said transistor is a bipolar transistor and said controlling input terminal is a base terminal of said bipolar transistor.

8. The battery charger of claim 5, further comprising:

a high-Z control circuit for selecting between said high-Z charge mode and said bulk charge mode and for configuring said current control circuit and said voltage control circuit to operate in the selected charge mode.

9. The battery charger of claim 8, wherein said high-Z control circuit comprises:

a voltage monitor for monitoring said battery voltage; and a logic circuit;

wherein when said voltage monitor detects that said battery voltage is less than said predefined minimum voltage level, said logic circuit in response configures said current control circuit and said voltage control circuit to operate in said high-Z charge mode.

10. The battery charger of claim 9, wherein said logic circuit configures said current control circuit in said high-Z charge mode by connecting said current control circuit to said load simulator circuit.

11. The battery charger of claim 10, wherein:

said current control circuit comprises a first error amplifier and a first reference voltage generator, said first reference voltage generator providing to said first error amplifier a first conditioning reference voltage during hi-Z charge mode and a rapid-charge reference voltage during bulk charge mode; and said voltage control circuit comprises a second error amplifier and a second reference voltage generator, said second reference voltage generator providing to said second error amplifier a second conditioning reference voltage during hi-Z charge mode and a termination reference voltage during bulk charge mode.

12. The battery charger of claim 11, wherein said logic circuit comprises:

an output stage to provide a first signal and a second signal when said battery voltage is less than said predefined minimum voltage level, said first signal causing said first reference voltage generator to generate said first conditioning reference voltage, and said second signal causing said second reference voltage generator to generate said second conditioning reference voltage; and a switching stage for connecting said current control circuit to said load simulator circuit in said high-Z charge mode.

13. A method for charging a secondary battery, said method comprising the steps of:

measuring a battery voltage across said battery; and activating a hi-Z charge mode when said battery voltage is less than a predefined minimum voltage level, wherein said step of activating a hi-Z charge mode comprises the steps of:

introducing a load resistance in series with said battery;

modulating said load resistance to maintain a first charge current through said battery; and regulating a charging voltage across said battery and said load resistance to a first voltage value greater than said battery voltage.

14. The method of claim 13, wherein said step of modulating said load resistance and said step of regulating a charging voltage are executed concurrently.

15. The method of claim 13, further comprising the steps of:

activating a bulk charge mode when said battery voltage is greater than said predefined minimum voltage level, wherein said step of activating a bulk charge mode comprises the steps of:

modulating said load resistance to a predetermined minimum resistance value;

maintaining a second charge current through said battery until said battery voltage reaches a predefined final voltage level, said second charge current is substantially greater than said first charge current; and regulating said charge current to maintain said charging voltage across said battery and said load resistance to said predefined final voltage level.

16. The method of claim 13, where in said step of introducing a load resistance in series with said battery comprises the step of:

connecting a transistor in series with said battery.

\* \* \* \* \*